Patented Aug. 25, 1931

1,820,872

UNITED STATES PATENT OFFICE

VINCENT SAUCHELLI, OF PITTSBURGH, PENNSYLVANIA, ASSIGNOR TO THE KOPPERS COMPANY, A CORPORATION OF DELAWARE

SULPHUR SOAP

No Drawing.    Application filed September 10, 1928.    Serial No. 305,136.

My invention relates to soap containing sulphur and has for an object the manufacture of a sulphur soap of greater effectiveness than sulphur soaps of the prior art, as well as possessing certain other advantages that will be found to obtain hereinbelow.

I have found that the effectiveness of sulphur soap, for example, in the treatment of skin disorders such as eczema or acne, is materially increased if the particle size of the sulphur is rendered sufficiently small. However, this effect is not marked until the particle size of the sulphur approaches colloidal limits.

Such colloidal limits are probably in the neighborhood of 0.1 microns, or 0.0001 mm., (Getman: "Outlines of Physical Chemistry", New York, 1918, p. 245), but particles having a size of less than about 15 microns or 0.015 mm. may be said to approach colloidal limits, and are closely related to true colloidal particles in many respects.

At present it is practically impossible to obtain commercial amounts of sulphur from sources other than those to be mentioned hereinbelow, having a particle size smaller than about 50 microns, and such relatively coarse sulphur has been found to lack the effectiveness of more finely divided sulphur, when used in soap.

Even sulphur which has been repeatedly ground in a so-called "colloid mill", which is an expensive and tedious process, is found to be relatively coarse, and aqueous suspensions of sulphur ground in this manner are found to settle out relatively rapidly.

I have found that when liquids containing certain thio-compounds, such, for example, as iron sulphide, nickel sulphide, cobalt sulphide, or certain thio-arsenates, are aerated or otherwise treated with an oxygen-containing gas, sulphur is liberated from the solution in very finely divided particles approaching colloidal limits in size, and in fact so small as to practically require a flotation operation for their removal from the liquid.

Flotation is in fact generally employed for the removal of sulphur liberated in processes of the sulphur recovery type, and is described in U. S. Patents Nos. 1,525,140 to Mann and Lebo, 1,578,560 to Sperr, 1,656,881 to Sperr and Jacobson, 1,719,180 to Jacobson and 1,719,762 to Gollmar.

By means of such flotation, sulphur of such fineness as to make difficult or prevent its separation by ordinary filtration, may readily be recovered.

As an example of such a process, the following is given: A suspension of about 1.0 percent of $Fe_2O_3$ or equivalent compound of iron in an alkaline solution, such as a 1 to 3% solution of sodium carbonate is recirculated through a cycle comprising an absorption stage wherein fuel gas is treated for the removal of hydrogen sulphide and an actification stage wherein the suspension is aerated for regeneration thereof and liberation and removal of free sulphur.

The sulphur recovered from a process employing a suspension of metallic compound generally contains some of the suspended metallic compound, which should be removed prior to using the sulphur in a soap preparation.

In another type of process, a solution containing an alkali, arsenic and absorbed sulphur is employed in the same manner. In a preferred form, such solutions contain a thio-arsenic compound, such as a sodium thio-arsenate, the aeration of which results in the liberation of free sulphur. This process has the advantage that the sulphur recovered is very pure, and contains substantially no injurious foreign insoluble matter.

The flotation sulphur recovered from such gas purification and analogous processes has been found to have a mean particle size of from about 2 to 14 microns (0.002 to 0.014 mm.), which approaches the colloidal. A substantial proportion of such particles have a particle size of less than 5 microns, and for most purposes may be considered substantially colloidal.

Moreover, examination of this sulphur under a powerful microscope shows that the particles exhibit the well-known Brownian movement, which is a further indication of their exceedingly fine state of subdivision.

Flotation sulphur recovered from fuel gas purification operations of the character recited herein is superior in certain respects and with regard to its germicidal or fungicidal properties to other sulphurs, even those which have been prepared by precipitation, grinding in colloid mills and other special and expensive processes. It is probable that, due partly to the extreme fineness but also to the source of the sulphur, small quantities of materials such as thio-cyanates, thiosulphates and the like are adsorbed by the sulphur particles in a manner not possible in the prior art, and that such materials in this condition become extremely effective germicides or fungicides, thus accounting in part for the surprising effectiveness of the soap in combating dermatitis and the like.

Moreover, and especially when, as in the preferred instance described, the flotation sulphur is introduced into the soap without having been dried, the sulphur retains a quality best described as "wettable". This property is marked with respect to other sulphurs, for example, ground flowers of sulphur, or sulphur precipitated for pharmaceutical purposes according to known methods, and it will be obvious that it is of especially great value and utility in a soap, where penetration, effective contact, and thorough distribution through the lather are of prime importance.

Consequently, I employ flotation sulphur from a fuel gas purification process for the manufacture of soap, and preferably proceed as follows:

The sulphur is first washed or otherwise treated to remove foreign matter, and filtered or otherwise dried until a paste containing from about 30 to 40 percent of water is obtained.

This paste is then thoroughly mixed with a good grade of neutral soap in a kneading machine or other suitable apparatus, and then extruded, pressed, or molded into the desired shape or shapes.

If necessary, the resultant cakes may be dried before marketing them.

As an alternate mode of procedure, the sulphur paste or slurry may be introduced into the soap in the salting out stage of soap manufacture.

It has actually been found in practice that this employment of flotation sulphur in paste form, without further drying, is highly advantageous as it apparently preserves the "wettability" of the sulphur, and avoids agglomeration of the particles which would take place if the sulphur were dried out.

As a further mode of procedure, however, the slurry or paste may be dried until a substantially water-free product is obtained. This dry product may then be mixed with the soap in the crutching operation, when sufficient water is present to produce a final product of suitable character. The mixture is, in this case, preferably pressed into molds, and the resultant cakes do not require a drying operation.

I have found that it is desirable to conduct the mixing and forming operations at substantially atmospheric temperatures in order to avoid any decomposition or reaction that might otherwise result from the high reactivity of this very finely divided sulphur.

In general, I prefer to employ a mixture containing 10 percent by weight of sulphur and 90 percent by weight of soap, but the proportion of sulphur may vary widely, according to the results desired. For example, the finished product may contain from about 5 to 50 percent of sulphur.

In order to improve the attractiveness of my product, I may add any suitable perfume. In general, free sulphur is odorless, but in order to prevent any possible sulphurous odor upon handling or storage, I may add to the mixture a substance having an inhibitory effect upon the liberation of hydrogen sulphide, for example, a thiosulphate.

As hereinabove recited, sulphur of the kind referred to usually does contain a certain amount of sodium thiosulphate, not merely in admixture therewith, but probably actually adsorbed by the minute sulphur particles, and therefore of especially great utility.

In no case is it necessary to grind or otherwise further comminute the flotation sulphur before incorporation into the final soap product.

In order to promote the effectiveness of my product, I may also add a small amount of a protective colloid, such as saponin, which will be effective to prevent the settling out of the sulphur from the liquid in which it is employed.

I have thus shown a product of considerable novelty and advantages with respect to the prior art, as well as a preferred method by which it may be made, and while I have given hereinabove certain examples, it will be understood that my invention is not confined to such specific illustrative examples except as it may be limited by the scope of the following claims.

I claim as my invention:

1. As a new article of manufacture, a soap containing sulphur separated by flotation from a liquid previously employed for the purification of fuel gas from hydrogen sulphide and analogous acidic impurities.

2. As a new article of manufacture, a soap having incorporated therein moist sulphur separated by flotation from a liquid previously employed for the purification of a gas from hydrogen sulphide and analogous acidic impurities, and having a particle size substantially the same as when separated from said liquid.

In testimony whereof, I have hereunto subscribed my name this 8th day of September, 1928.

VINCENT SAUCHELLI.